(12) United States Patent
Liu et al.

(10) Patent No.: US 12,657,875 B2
(45) Date of Patent: Jun. 16, 2026

(54) METHOD FOR TRAINING IMAGE PROCESSING MODEL, IMAGE CLASSIFYING METHOD, AND IMAGE PROCESSING DEVICE

(71) Applicant: BOE Technology Group Co., Ltd., Beijing (CN)

(72) Inventors: Tong Liu, Beijing (CN); Zeyu Shangguan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 275 days.

(21) Appl. No.: 18/565,030

(22) PCT Filed: Sep. 20, 2022

(86) PCT No.: PCT/CN2022/120011
§ 371 (c)(1),
(2) Date: Nov. 28, 2023

(87) PCT Pub. No.: WO2023/124278
PCT Pub. Date: Jul. 6, 2023

(65) Prior Publication Data
US 2024/0203097 A1     Jun. 20, 2024

(30) Foreign Application Priority Data

Dec. 29, 2021     (CN) .......................... 202111640853.8

(51) Int. Cl.
*G06V 10/764*     (2022.01)
*G06T 7/11*     (2017.01)
*G06V 10/44*     (2022.01)

(52) U.S. Cl.
CPC .............. *G06V 10/764* (2022.01); *G06T 7/11* (2017.01); *G06V 10/44* (2022.01);
(Continued)

(58) Field of Classification Search
CPC .... G06V 10/764; G06V 10/44; G06V 10/762; G06V 10/74; G06V 10/774; G06V 10/82;
(Continued)

(56) References Cited

U.S. PATENT DOCUMENTS

| | | | |
|---|---|---|---|
| 12,026,968 B2 * | 7/2024 | Huang | ................... G06F 18/214 |
| 12,288,154 B2 * | 4/2025 | Eykholt | ................ G06F 18/231 |

(Continued)

FOREIGN PATENT DOCUMENTS

| | | |
|---|---|---|
| CN | 107154969 A | 9/2017 |
| CN | 108388888 A | 8/2018 |

(Continued)

OTHER PUBLICATIONS

Chen, Da, et al. "Self-supervised learning for few-shot image classification." arXiv:1911.06045v1. Nov. 14, 2019. Retrieve from https://arxiv.org/abs/1911.06045v1.

(Continued)

*Primary Examiner* — John B Strege
(74) *Attorney, Agent, or Firm* — IPro, PLLC

(57)     ABSTRACT

Disclosed is a method for training an image processing model. The method includes acquiring a plurality of original image sets; cropping the plurality of original images in the plurality of original image sets to acquire a training sample set, wherein each of the training samples represents one original image, or a subimage acquired by cropping one original image; determining a plurality of positive sample pairs and a plurality of negative sample pairs from the training sample set, wherein each of the positive sample pairs comprises two training samples acquired based on different said original images in the same original image set, and each of the negative sample pairs comprises two training samples acquired based on the original images in different said original image sets; and training the image processing
(Continued)

model based on the plurality of positive sample pairs and the plurality of negative sample pairs.

16 Claims, 5 Drawing Sheets

(52) U.S. Cl.
CPC ............... *G06T 2207/20081* (2013.01); *G06T 2207/20084* (2013.01); *G06T 2207/20132* (2013.01)

(58) Field of Classification Search
CPC ............. G06T 7/11; G06T 2207/20081; G06T 2207/20084; G06T 2207/20132; G06F 18/00; G06N 3/04; G06N 3/08
See application file for complete search history.

(56) References Cited

U.S. PATENT DOCUMENTS

| | | | |
|---|---|---|---|
| 2021/0166073 | A1 | 6/2021 | Gou et al. |
| 2021/0319560 | A1* | 10/2021 | Xia ....................... G06T 7/0012 |
| 2022/0164580 | A1* | 5/2022 | Moura .................. G06F 18/217 |
| 2023/0256600 | A1* | 8/2023 | Hirakawa .......... G05B 19/4103 |
| | | | 700/245 |
| 2023/0298334 | A1* | 9/2023 | Ren ......................... G06N 3/084 |
| | | | 382/156 |

FOREIGN PATENT DOCUMENTS

| | | | |
|---|---|---|---|
| CN | 111401307 | A | 7/2020 |
| CN | 111506773 | A | 8/2020 |
| CN | 111738133 | A | 10/2020 |
| CN | 113111960 | A | 7/2021 |
| CN | 112990236 | B | 8/2021 |
| CN | 113435545 | A | 9/2021 |
| CN | 113705596 | A | 11/2021 |
| CN | 114299363 | A | 4/2022 |
| WO | 2021136027 | A1 | 7/2021 |

OTHER PUBLICATIONS

CN202111640853.8 first office action dated Mar. 1, 2025.

* cited by examiner

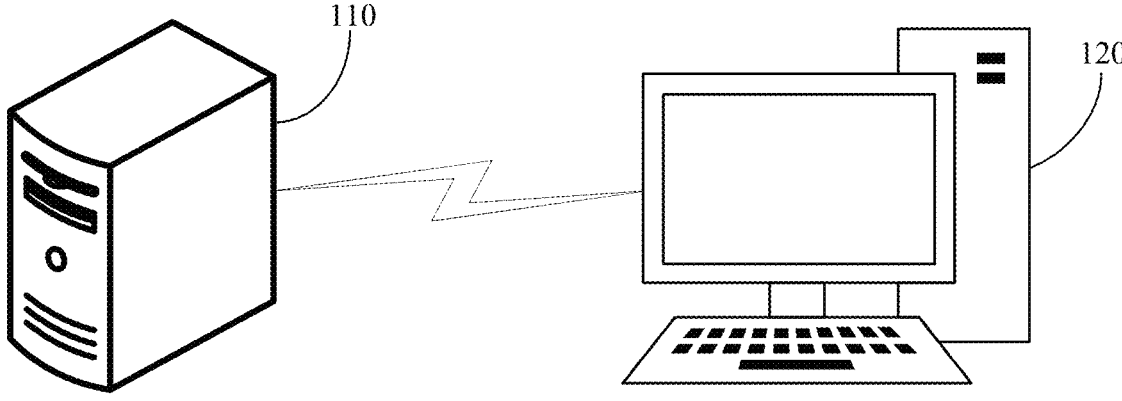

FIG. 1

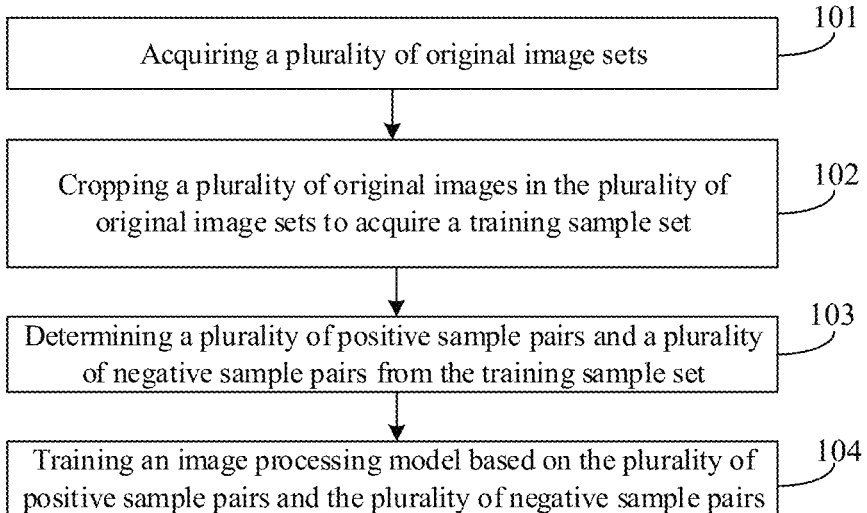

| 101 | Acquiring a plurality of original image sets |

Acquiring a plurality of original image sets — 101

Cropping a plurality of original images in the plurality of original image sets to acquire a training sample set — 102

Determining a plurality of positive sample pairs and a plurality of negative sample pairs from the training sample set — 103

Training an image processing model based on the plurality of positive sample pairs and the plurality of negative sample pairs — 104

FIG. 2

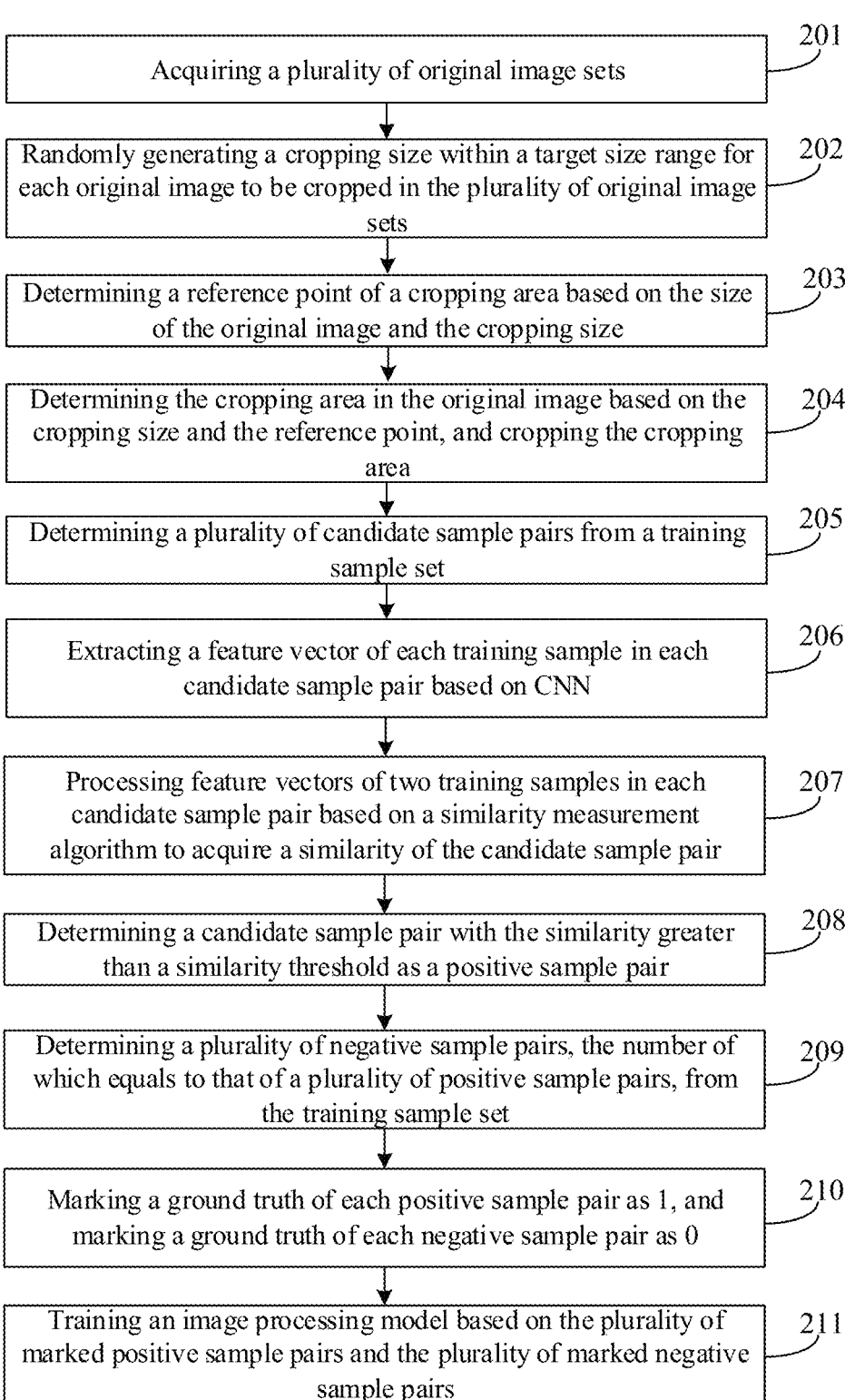

Acquiring a plurality of original image sets — 201

Randomly generating a cropping size within a target size range for each original image to be cropped in the plurality of original image sets — 202

Determining a reference point of a cropping area based on the size of the original image and the cropping size — 203

Determining the cropping area in the original image based on the cropping size and the reference point, and cropping the cropping area — 204

Determining a plurality of candidate sample pairs from a training sample set — 205

Extracting a feature vector of each training sample in each candidate sample pair based on CNN — 206

Processing feature vectors of two training samples in each candidate sample pair based on a similarity measurement algorithm to acquire a similarity of the candidate sample pair — 207

Determining a candidate sample pair with the similarity greater than a similarity threshold as a positive sample pair — 208

Determining a plurality of negative sample pairs, the number of which equals to that of a plurality of positive sample pairs, from the training sample set — 209

Marking a ground truth of each positive sample pair as 1, and marking a ground truth of each negative sample pair as 0 — 210

Training an image processing model based on the plurality of marked positive sample pairs and the plurality of marked negative sample pairs — 211

FIG. 3

METHOD FOR TRAINING IMAGE PROCESSING MODEL, IMAGE CLASSIFYING METHOD, AND IMAGE PROCESSING DEVICE

This application is a U.S. national stage of international application No. PCT/CN2022/120011, filed on Sep. 20, 2022, which claims priority to Chinese Patent Application No. 202111640853.8, filed on Dec. 29, 2021, and entitled "IMAGE PROCESSING MODEL TRAINING METHOD, IMAGE CLASSIFICATION METHOD AND DEVICE", the disclosures of which are herein incorporated by reference in their entireties.

TECHNICAL FIELD

The present disclosure relates to the field of machine learning, and in particular, to a method and apparatus for training an image processing model, and an image classifying method and apparatus.

BACKGROUND OF THE INVENTION

In the field of machine learning, a large number of training samples are adopted to train an image processing model to ensure that the performance of the image processing model obtained by training is good. For example, for an image classifying model, a large number of images of different categories are required as training samples to train the image classifying model.

However, due to the limited number of training samples that can be used in some scenarios (for example, the limited number of images of some categories), the effect of the image processing model obtained by training is poor.

SUMMARY OF THE INVENTION

The present disclosure provides a method and apparatus for training an image processing model, and an image classifying method and apparatus. The technical solutions are as follows.

In some embodiments, a method for training an image processing model is provided. The method includes:

acquiring a plurality of original image sets, wherein each of the original image sets includes a plurality of original images of the same category, and categories of the original images included in different original image sets are different;

acquiring a training sample set by cropping the plurality of original images in the plurality of original image sets, wherein the training sample set includes a plurality of training samples, and each of the training samples represents one original image or a subimage acquired by cropping the original image;

determining a plurality of positive sample pairs and a plurality of negative sample pairs from the training sample set, wherein each of the positive sample pairs includes two training samples acquired based on different original images in the same original image set, and each of the negative sample pair includes two training samples acquired based on the original images in different original image sets; and training the image processing model based on the plurality of positive sample pairs and the plurality of negative sample pairs.

In some embodiments, for each original image to be cropped in the plurality of original image sets, a cropping size within a target size range is generated randomly; a reference point of a cropping area is determined based on a size of the original image and the cropping size; and the cropping area is determined in the original image based on the cropping size and the reference point, and the cropping area is cropped.

In some embodiments, the target size range includes a width range and a height range, and the cropping size includes a width within the width range and a height within the height range; and the cropping area is a rectangular area, and the reference point of the cropping area is a vertex of the rectangular area or a central point of the rectangular area.

In some embodiments, a plurality of candidate sample pairs are determined from the training sample set, wherein each of the candidate sample pairs includes two training samples acquired based on different original images in the same original image set; a similarity of each candidate sample pair is determined; and the candidate sample pair with the similarity greater than a similarity threshold is determined as the positive sample pair.

In some embodiments, for each of the candidate sample pairs, a feature vector of each training sample in the candidate sample pair is extracted based on a convolutional neural network; and feature vectors of two training samples in the candidate sample pair are processed based on a similarity measurement algorithm to acquire the similarity of the candidate sample pair.

In some embodiments, a plurality of negative sample pairs from the training sample set, the number of the negative sample pairs is equal to the number of the plurality of positive sample pairs.

In some embodiments, a ground truth of each of the positive sample pairs is marked as 1, and a ground truth of each of the negative sample pairs is marked as 0; and an image processing model is trained based on the plurality of marked positive sample pairs and the plurality of marked negative sample pairs.

In some embodiments, an image classifying method is provided. The image classifying method includes:

acquiring a to-be-classified target image; and inputting the target image into an image classifying model to acquire a category of the target image outputted by the image classifying model, wherein the image classifying model is acquired by training based on the method for training an image processing model according to any of the above embodiments.

In some embodiments, the target image is inputted into the image classifying model to acquire a similarity between the target image and reference images of different categories outputted by the image classifying model; and a category of a reference image having the highest similarity with respect to the target image in the reference images of different categories is determined as the category of the target image.

In some embodiments, the target image is inputted into the image classifying model to acquire a similarity between the target image and image features of different categories outputted by the image classifying model; and a category of an image feature having the highest similarity with respect to the target image in the image features of different categories is determined as the category of the target image, wherein the image features of each category are acquired by performing feature extraction on a plurality of training samples of the category.

In some embodiments, an image processing device including a processor and a memory storing one or more instructions thereon is provided. Wherein the one or more instructions are loaded and executed by the processor to implement the method for training the image processing model according to any of the above embodiments, or the image classifying method according to any of the above embodiments.

In some embodiments, a non-transitory computer-readable storage medium storing one or more instructions thereon is provided. The one or more instructions are loaded and executed by a processor to implement the method for training the image processing model according to any of the above embodiments, or the image classifying method according to any of the above embodiments.

In some embodiments, a computer program product including computer instruction is provided. The computer instruction is loaded and executed by a processor to implement the method for training the image processing model according to any of the above embodiments, or the image classifying method according to any of the above embodiments.

BRIEF DESCRIPTION OF THE DRAWINGS

For clearer descriptions of the technical solutions according to the embodiments of the present disclosure, the drawings required to be used in the description of the embodiments are briefly introduced below. It is obvious that the drawings in the description below are only some embodiments of the present disclosure, and it is obvious for those skilled in the art that other drawings can be obtained according to the drawings without creative efforts.

FIG. 1 is a schematic structural diagram of a system for training an image processing model according to some embodiments of the present disclosure;

FIG. 2 is a schematic flowchart of a method for training an image processing model according to some embodiments of the present disclosure;

FIG. 3 is a schematic flowchart of another method for training an image processing model according to some embodiments of the present disclosure;

DETAILED DESCRIPTION

Figure 4:
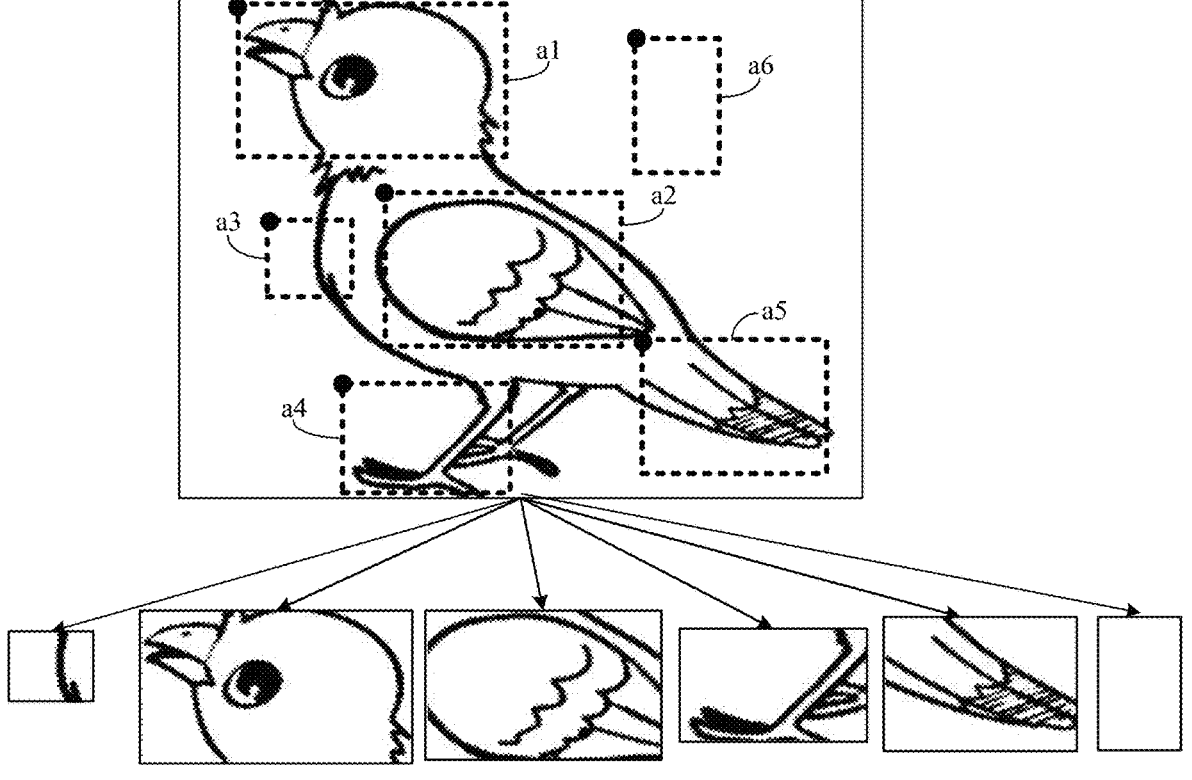
FIG. 4 is a schematic diagram illustrating the cropping of an original image according to some embodiments of the present disclosure.

For clearer descriptions of the objects, technical solutions, and advantages of the present disclosure, the embodiments of the present disclosure are further described in detail below with reference to the drawings. The method for training the image processing model, provided according to embodiments of the present disclosure, is applicable to scenarios with a small number of samples (namely few samples), and correspondingly, the training method is also called a few-sample learning method. The aim of few-sample learning is to achieve good model training accuracy in the case of limited samples.

For the improvement on the performance of the few-sample learning method, modification is generally made from three aspects of data (i.e., training samples), models, and training algorithms. In the case that the training samples are improved, the training samples are converted to acquire new training samples, and therefore the training sample set is expanded. Or, marked or unmarked samples are converted to acquire new training samples, and therefore the training sample set is expanded. Or, data in similar data sets of the training samples are converted to acquire new training samples, and therefore the training sample set is expanded. In the case that the model is improved, the model is trained based on a multi-task learning method, an embedded learning method and a learning method based on external memory. In the case that the training algorithm is optimized, a method for improving the existing parameters, a method for improving meta-learning parameters or a learning optimizer is adopted.

FIG. 1 is a schematic structural diagram of a system for training an image processing model according to some embodiments of the present disclosure. Referring to FIG. 1, the system includes a server 110 and a terminal 120. A wired or wireless communication connection is established between the server 110 and the terminal 120. In some embodiments, the server 110 is an independent physical server, or is a server cluster or a distributed system including a plurality of physical servers. The terminal 120 is a personal computer (PC), a tablet PC, a smart phone, a wearable device, a smart robot, or other terminals with data calculation, processing, and storage capabilities.

In the embodiments of the present disclosure, the terminal device 120 in the system is configured to acquire an original image set for model training and send original images to the server 110. The server 110 further processes the original images in the original image set, and trains the image processing model by using the processed original images as training samples. The trained image processing model is applicable to an image classifying task, an image identification task, an image segmentation task and the like.

Or, the system is one that is capable of performing specific image processing tasks (e.g., image classifying tasks). Correspondingly, the terminal device 120 in the system is configured to acquire a to-be-detected original image, and sends the to-be-detected original image to the server 110 for detection. The server 110 stores the trained image processing model in advance. After acquiring the to-be-detected original image, the server 110 inputs the original image to the image processing model, and the image processing model further detects and identifies the original image and outputs a detection result. The server 110 then sends the detection result to the terminal 120.

FIG. 2 is a flowchart of a method for training an image processing model according to some embodiments of the present disclosure, wherein the method is applicable to an image processing device, which is the server 110 as shown in FIG. 1. Referring to FIG. 2, the method includes the following steps.

In step 101, a plurality of original image sets are acquired.

The image processing device acquires a plurality of original image sets that are stored in advance, or acquires a plurality of original image sets sent by other devices (e.g., terminals), wherein each original image set includes a plurality of original images of the same category, and the categories of the original images included in different original image sets are different. It is understood that the categories of all original images included in each original image set are the same, i.e., each original image set includes only one category of original images. The category of each original image in the plurality of original image sets is manually marked, and the category refers to a category of a subject object in the original image.

In step 102, a plurality of original images of a plurality of original image sets are cropped to acquire a training sample set.

The image processing device crops a plurality of original images in each original image set to acquire a training sample set. For example, the image processing device crops each original image in each original image set. The training sample set acquired by cropping a plurality of original images by the image processing device includes a plurality of training samples, wherein each training sample represents one original image, or a subimage acquired by cropping one original image.

Wherein the number of subimages acquired by cropping an original image is greater than or equal to 1, and the sizes and/or positions of any two subimages in the original image acquired by cropping an original image are different from each other. In some embodiments, the size and/or position of each subimage in the original image are determined randomly by the image processing device, or are configured in advance in the image processing device.

It is understood that the category of any subimage acquired by cropping an original image is the same as that of the original image. By cropping each original image in the original image set and determining the subimages acquired by cropping as training samples, the number of training samples in the training sample set is effectively expanded.

In step 103, a plurality of positive sample pairs and a plurality of negative sample pairs are determined from the training sample set.

After the image processing device acquires the training sample set, a plurality of positive sample pairs and a plurality of negative sample pairs are determined from the training sample set, wherein each negative sample pair includes two training samples acquired based on original images in different original image sets, and each positive sample pair includes two training samples acquired based on different original images in the same original image set. That is, the image processing device determines two training samples of the same category from different original images as a positive sample pair, and determines two training samples of different categories as a negative sample pair.

It is understood that as the categories of two training samples in each positive sample pair are the same, it is ensured that both training samples in each positive sample pair include some or all of the image features of the subject object of the same category. Therefore, after being trained based on the positive sample pair, the image processing model accurately learns the features of the subject object of the category.

In step 104, an image processing model is trained based on the plurality of positive sample pairs and the plurality of negative sample pairs.

In the embodiments of the present disclosure, an initial image processing model is stored in advance in the image processing device. The image processing model is a convolutional neural network (CNN) model. After the image processing device determines a plurality of positive sample pairs and a plurality of negative sample pairs from the training sample set, the image processing model is trained based on the plurality of positive sample pairs and the same number of negative sample pairs as the number of positive samples, and the image processing device stops the training of the image processing model in the case that the precision of the image processing model reaches a preset precision, or the number of training rounds of the image processing model reaches a preset number of rounds.

It is understood that in each original image set, differences exist in the position and size of subject objects in different original images. Therefore, in a scenario where the number of original images included in an original image set is limited, in the case that an image processing model is trained directly based on the original image set, it is difficult for the image processing model to accurately acquire features of subject objects in different original images of the same category. Accordingly, the effect of the image processing model acquired by training is poor. In the embodiments of the present disclosure, as the original image is cropped to acquire a training sample set, categories of the two training samples in each positive sample pair in the training sample set defined to train the image processing model are the same, while the categories of two training samples in each negative sample pair are different, and therefore, it is ensured that the image processing model acquired by training learns the features of images of different categories well, that is, the features of subject objects of different categories.

In summary, embodiments of the present disclosure provide a method for training an image processing model. According to the method for training the image processing model, by cropping a plurality of original images, the number of training samples is effectively expanded, such that the effect of the image processing model acquired by training is good. Categories of the two training samples in each positive sample pair defined to train the image processing model are the same, while the categories of the two training samples in each negative sample pair are different. Therefore, it is ensured that the image processing model acquired by training learns the features of images of different categories well, and then the effect of the image processing model is further improved.

FIG. 3 is a flowchart of another method for training an image processing model according to some embodiments of the present disclosure. The method for training the image processing model is applicable to an image processing device, which is a server 110 as shown in FIG. 1. Referring to FIG. 3, the method includes the following steps.

In step 201, a plurality of original image sets are acquired.

The image processing device acquires a plurality of original image sets that are stored in advance, or acquires a plurality of original image sets sent by other devices (e.g., terminals), wherein each original image set includes a plurality of original images of the same category, and the categories of the original images included in different original image sets are different. It is understood that the categories of all original images included in each original image set are the same, i.e., each original image set includes only one category of original images. The category of each original image in the plurality of original image sets is manually marked, and the category refers to a category of a subject object in the original image. The quantities of original images included in different original image sets are the same or different.

In some embodiments, the category of the original image is a species category of an animal, or is a species category of a plant, or is further a species category of food, or further a species category of furniture, which is not limited in the embodiments of the present disclosure.

For example, in the case that the to-be-trained image processing model is a model for identifying a species category of an animal, a plurality of original image sets of different species are stored in advance in the image processing device, wherein the original image set of each species includes a plurality of original images of the species.

In step 202, for each original image to be cropped in the plurality of original image sets, a cropping size within the target size range is generated randomly.

After the image processing device acquires the plurality of original image sets, a cropping size within a target size range is generated randomly for each original image to be cropped in the plurality of original image sets, such that one subimage is cropped out of an original image based on each generated cropping size, wherein the target size range is stored in advance by the image processing device, and the target size range is determined based on a size of an original image. For example, the upper limit of the target size range equals to the size of an original image.

In some embodiments, the cropping area acquired in the case that the image processing device crops an original image represents a rectangular area. Accordingly, the target size range includes a width range and a height range, and the cropping size includes a width within the width range and a height within the height range.

It is understood that the cropping area is further an area of other shapes, and accordingly, the target size range includes ranges for other parameters. For example, in the case that the cropping area is circular, the target size range is a range of a radius or a diameter.

For example, it is assumed that the target size range has a width range $[W_{max}, W_{min}]$ and a height range $[H_{max}, H_{min}]$. A certain original image set D includes K original images, and for a k-th original image $I_k$ (k represents an integer not greater than K) in the K original images, the image processing device randomly generates T cropping sizes, that is, the image processing device performs T (T represents an integer greater than 1) cropping on the k-th original image $I_k$ to acquire T subimages, wherein the width $w_t$ of a t-th (t represents an integer not greater than T) cropping size of the T clipping sizes satisfies: $W_{max} \leq w_t \leq W_{min}$, and the height $h_t$ satisfies:

$$H_{max} \leq h_t \leq H_{min}.$$

In step 203, a reference point of the cropping area is determined based on the size of the original image and the cropping size.

The image processing device further determines the reference point of the cropping area based on the size of a to-be-cropped original image and one cropping size generated randomly. The reference point is defined to determine the position of the cropping area in the to-be-cropped original image. In the embodiments of the present disclosure, the reference point determined by the image processing device is required to enable the cropping area to be positioned in the to-be-cropped original image.

In some embodiments, the cropping area represents a rectangular area, and the reference point of the cropping area represents a vertex of the rectangular area (for example, the top left vertex of the rectangular area), or a central point of the rectangular area. Or, in the case that the cropping area is circular, the reference point of the cropping area is the center of the circular area.

In step 204, a cropping area is determined in the original image based on the cropping size and the reference point, and the cropping area is cropped.

For a to-be-cropped original image, the image processing device determines a cropping size in the original image based on the randomly determined cropping size and the determined reference point, and then crops the cropping area to acquire a subimage.

In some embodiments, for each original image to be cropped, the image processing device determines a plurality of cropping areas based on the method shown in above steps 202 to 204. The plurality of cropping areas differ in size and/or position in the original image. Accordingly, after each original image is cropped by the image processing device, a plurality of subimages are acquired. It is understood that the image processing device determines each original image as a training sample, and each subimage as a training sample.

It is also understood that the quantities of subimages acquired by cropping different original images by the image processing device are the same or different. In the case that the image processing device crops T subimages in each original image, the image processing device generates T+1 training samples based on each original image.

For example, in the case that a to-be-cropped original image is as shown in FIG. 4, the image processing device determines six cropping areas from a1 to a6 in the to-be-cropped original image. After the image processing device crops the six cropping areas, six subimages are acquired.

In step 205, a plurality of candidate sample pairs are determined from the training sample set.

After the image processing device crops a plurality of original images in a plurality of original image sets, a training sample set is acquired. The training sample set includes a plurality of training samples, wherein each training sample represents one original image or subimages acquired by cropping one original image. Then, the image processing device determines a plurality of candidate sample pairs from the training sample set, wherein each candidate sample pair includes two training samples acquired based on different original images in the same original image set. That is, the two training samples included in each candidate sample pair are acquired based on two original images of the same category.

In step 206, a feature vector of each training sample in each candidate sample pair is extracted based on CNN.

After the image processing device determines a plurality of candidate sample pairs from the training sample set, each training sample in each candidate sample pair is inputted into the CNN. The CNN performs feature extraction on the inputted training sample and calculates a feature vector of each training sample.

In the embodiments of the present disclosure, an image processing device first trains initial CNN based on a large number of labeled image datasets, for example, ImageNet datasets, such that the CNN extracts features of training samples well and has a certain image classifying capability, wherein the basic structure of the CNN includes a convolutional layer, a pooling layer, and a full connection layer, and in the network structure of the CNN, the convolutional layer and the pooling layer are alternately distributed. The convolutional layer extracts features of the training samples through convolution calculation, and the pooling layer performs down-sampling processing on the training samples inputted into a CNN model, namely performing reduction processing on the training samples and simultaneously retaining important information in the training samples. The full connection layer classifies the images based on the image features determined by the convolutional layer.

The image processing device removes the full connection layer of the initial CNN upon completing the training of the initial CNN. Then, the image processing device inputs each training sample in each candidate sample pair into the CNN in which the full connection layer is removed. The CNN performs feature extraction on the inputted training sample and calculates a feature vector of each training sample.

In step 207, for each candidate sample pair, feature vectors of two training samples in the candidate sample pair are processed based on a similarity measurement algorithm to acquire the similarity of the candidate sample pair.

The similarity measurement algorithm includes cosine distance (also called cosine similarity), euclidean metric (also called euclidean distance), and barytari distance (also called barytan distance).

In step 208, the candidate sample pair with a similarity greater than the similarity threshold are determined as a positive sample pair.

After the image processing device determines the similarity of each candidate sample pair, a candidate sample pair with the similarity greater than the similarity threshold in the plurality of candidate sample pairs is determined as a positive sample pair. The similarity threshold is a fixed value configured in advance in the image processing device.

In some embodiments, the image processing device employs a clustering (for example, K-means clustering) algorithm to cluster the plurality of candidate sample pairs according to the similarity of each candidate sample pair. For example, the image processing device clusters the plurality of candidate sample pairs into two types, and determines a type of candidate sample pair having a higher similarity as a positive sample pair.

It is understood that although the two training samples in each candidate sample pair are from two original images of the same category, image features contained in the two training samples have a great difference. For example, at least one of the two training samples does not contain image features of a subject object of the category, or the two training samples contain image features of different parts of the subject object. According to the embodiments of the present disclosure, the similarity of the two training samples is calculated, and the candidate sample pair with the similarity greater than the similarity threshold is determined as the positive sample pair, such that the similarity of the two training samples in each positive sample pair determined by the image processing device is high, that is, the probability that the two training samples both include the image features of the subject objects in the same category is high. Accordingly, by training the image processing model based on the plurality of positive sample pairs, it is ensured that the image processing model learns the features of the plurality of subject objects corresponding to the same category well.

For example, in the case that the image processing device determines a positive sample pair based on a K means clustering algorithm, the image processing device determines the similarity value of 0.75 and the similarity value of 0.25 as two clustering centers. Then, the image processing device calculates the distance between the similarity value of each candidate sample pair and the two clustering centers and distributes the similarity value of each candidate sample pair to the clustering center closest thereto. Finally, the image processing device determines a plurality of candidate sample pairs corresponding to a plurality of similarities with the similarity value of 0.75 as the clustering center as positive sample pairs.

In step 209, a plurality of negative sample pairs, the number of which equals to that of the plurality of positive sample pairs, are determined from the training sample set.

After the image processing device determines a plurality of positive sample pairs from the plurality of candidate sample pairs, a plurality of negative sample pairs, the number of which equals to that of the plurality of positive sample pairs, are determined from the training sample set, wherein each negative sample pair includes two training samples acquired based on original images in different original image sets.

It is understood that the plurality of positive sample pairs and the plurality of negative sample pairs determined by the image processing device will be defined to train the image processing model. In the case that the number of the plurality of the positive sample pairs defined to train equals to that of the negative sample pairs defined to train, the training effect of the image processing model is good.

It is also understood that the number of the plurality of the negative sample pairs is further different from that of the plurality of the positive sample pairs.

In step 210, a ground truth of each positive sample pair is marked as 1, and a ground truth of each negative sample pair is marked as 0.

After the image processing device determines the plurality of positive sample pairs and the plurality of negative sample pairs, a ground truth of each positive sample pair of the plurality of positive sample pairs is marked as 1, and a ground truth of each negative sample pair of the plurality of negative sample pairs is marked as 0. A ground truth of a sample pair, which is further called a label of the sample pair, is defined to characterize the similarity of two training samples in the sample pair.

In step 211, an image processing model is trained based on the plurality of marked positive sample pairs and the plurality of marked negative sample pairs.

In the embodiments of the present disclosure, an initial image processing model is stored in advance in the image processing device. The image processing device performs multiple rounds of training on the initial image processing model based on the plurality of marked positive sample pairs and the plurality of marked negative sample pairs. and the image processing device stops the training of the image processing model in the case that the precision of the image processing model reaches a preset precision, or the number of training rounds of the image processing model reaches a preset number of rounds.

The preset number of rounds is negatively correlated with the number of sample pairs (i.e., the total number of positive and negative sample pairs) defined to train the image processing model. The larger the number of sample pairs defined to train is, the fewer the number of training rounds of the image processing model is. For example, in the case that the number of sample pairs defined to train the image processing model is 100 ten thousand, the preset number of rounds is 10. In the case that the number of sample pairs defined to train is 1 ten thousand, the preset number of rounds is 100.

It is understood that in the process of training the image processing model, the image processing device sequentially inputs the two training samples in each positive sample pair and the two training samples in each negative sample pair into the image processing model. The image processing model then extracts features of two training samples in each inputted sample pair and determines a feature vector of each training sample. Then, the image processing model determines a similarity of each sample pair based on the feature vector of each training sample. Finally, the image processing device adjusts parameters of the image processing model based on a difference between the similarity of each positive sample and the ground truth of the positive sample pair and a difference between the similarity of each negative sample and the ground truth of the negative sample pair determined by the image processing model to optimize the precision of the image processing model.

In some embodiments, the image processing model trained by the image processing device is the CNN defined to remove the full connection layer in above step 206.

After completing the training of the image processing model, the image processing device applies the image processing model to a specific image processing task (for example, an image classifying task, an image identification task, or an image segmentation task, etc.).

It is understood that the sequence of the steps of the method for training the image processing model according to the embodiments of the present disclosure is appropriately adjusted, and the steps are further correspondingly increased or decreased as needed. For example, the above step 202 and step 203 are deleted as needed, and accordingly, in the above step 204, the image processing device crops a fixed cropping area in the original image. Any variations of the method that may be envisaged by those skilled in the art within the technical scope disclosed herein also fall within the protection scope of the present disclosure and thus are not described herein.

In summary, embodiments of the present disclosure provide a method for training an image processing model. According to the method for training the image processing model, by cropping a plurality of original images, the number of training samples is effectively expanded, such that the effect of the image processing model acquired by training is good. Categories of the two training samples in each positive sample pair defined to train the image processing model are the same, and the similarities are high, while the categories of the two training samples in each negative sample pair are different. Therefore, it is ensured that the image processing model acquired by training learns the features of images of different categories well, and then the effect of the image processing model is further improved.

Figure 5:
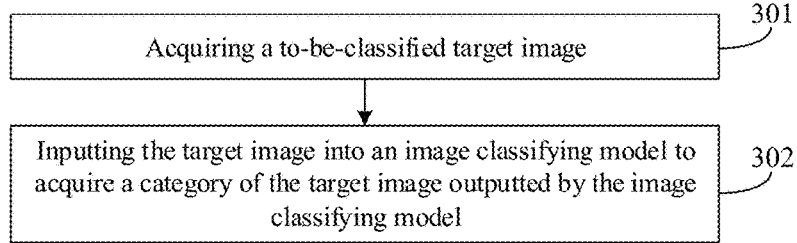
FIG. 5 is a schematic flowchart of an image classifying method according to some embodiments of the present disclosure.

FIG. 5 is a schematic flowchart of an image classifying method according to some embodiments of the present disclosure, wherein the image classifying method is applicable to an image processing device. The image processing device is a server 110 or a terminal 120 in the scenario shown in FIG. 1. Referring to FIG. 5, the method includes the following steps.

In step 301, a to-be-classified target image is acquired.

In the embodiments of the present disclosure, in the case that the image processing device is a server, the server acquires a to-be-classified target image, which is sent by a terminal. In the case that the image processing device is a terminal, the terminal stores the to-be-classified target image in advance, or the terminal acquires to-be-classified target images, which are sent by other devices (for example, another terminal). It is understood that the to-be-classified target image does not have a manually marked category, i.e., the category of the target image is currently unknown.

In step 302, a target image is inputted into the image classifying model to acquire a category of the target image outputted by the image classifying model.

The image processing device stores an image classifying model in advance, and the image classifying model is acquired by training based on the method for training the image processing model according to the above method embodiments. After the image processing device acquires a to-be-classified target image, the to-be-classified target image is inputted into the image classifying model, and the image classifying model further identifies and outputs the category of the target image.

It is understood that in the case that the image processing device is a terminal, the image classifying model is sent to the terminal by a server.

As one possible example, the above step 302 includes the following steps.

302*a*1, the target image is inputted into the image classifying model to acquire a similarity between the target image and reference images of different categories outputted by the image classifying model.

The image classifying model extracts image features of the inputted target image, and determines a similarity between the target image and a plurality of reference images of different categories based on the image features of the target image and the image features of the plurality of reference images of different categories. That is, the image classifying model compares the target image with each reference image to determine a similarity between the target image and each reference image. The plurality of reference images are training samples used in training the image classifying model.

302*a*2, a category of a reference image having the highest similarity with respect to the target image in the reference images of different categories is determined as the category of the target image.

In the embodiments of the present disclosure, after the image processing device calculates a similarity between the target image and each reference image, the category of the reference image having the highest similarity with respect to the target image is determined as the category of the target image.

For a scenario that a plurality of reference images are included in each category, the image processing device calculates a mean of similarity between the target image and each reference image of the category. Then, the image processing device determines a category with the highest mean of the similarity as the category of the target image.

As another possible embodiment, the above step 302 includes the following steps.

In step 302*b*1, a target image is inputted into an image classifying model to acquire a similarity between the target image and image features of different categories outputted by the image classifying model.

The image classifying model extracts image features of the target image, and determines a similarity between the target image and the image features of different categories based on the image features of the target image and the image features of different categories. The image features of each category are acquired by performing feature extraction on a plurality of training samples in the category. In some embodiments, the mean of image features of a plurality of training samples of the category is determined as image features of the category.

In step 302*b*2, a category of an image feature having the highest similarity with respect to a target image in image features of different categories is determined as the category of the target image.

The image classifying model determines a category of the target image based on a similarity between the target image and the image features of a plurality of different categories, which enables the image processing model to rapidly determine the category of the target image, such that the classification efficiency is improved.

In summary, embodiments of the present disclosure provide an image classifying method. According to the image classifying method, a to-be-classified target image is inputted into an image classifying model, and the image classifying model further outputs a category of the target image.

As the image classifying model is acquired by training based on the method for training the image processing model according to the above method embodiments, the performance of the image classifying model is good. That is, the image classifying model extracts image features of the target image well, and accurately determines a category of the target image based on the image features of the target image.

Figure 6:
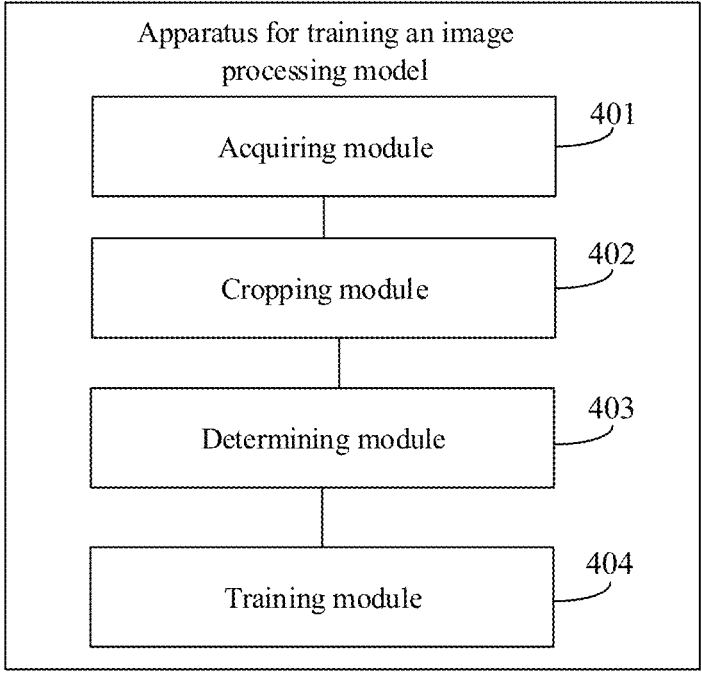
FIG. 6 is a schematic structural diagram of a device for training an image processing model according to some embodiments of the present disclosure.

FIG. 6 is a structural block diagram of an apparatus for training an image processing model according to some embodiments of the present disclosure. As shown in FIG. 6, the apparatus includes:

an acquiring module 401, configured to acquire a plurality of original image sets, wherein each original image set includes a plurality of original images of the same category, and the categories of the original images included in different original image sets are different;

a cropping module 402, configured to crop the plurality of original images in the plurality of original image sets to acquire a training sample set, wherein the training sample set includes a plurality of training samples, and each training sample represents one original image, or a subimage acquired by cropping the original image;

a determining module 403, configured to determine a plurality of positive sample pairs and a plurality of negative sample pairs from the training sample set, wherein each positive sample pair includes two training samples acquired based on different original images in the same original image set, and each negative sample pair includes two training samples acquired based on original images in different original image sets; and a training module 404, configured to train the image processing model based on the plurality of positive sample pairs and the plurality of negative sample pairs.

In some embodiments, the cropping module 402 is configured to randomly generate a cropping size within a target size range for each original image to be cropped in a plurality of original image sets, determine a reference point of a cropping area based on a size of the original image and the cropping size, and determine the cropping area in the original image based on the cropping size and the reference point, and crop the cropping area.

In some embodiments, the target size range includes a width range and a height range, and the cropping size includes a width within the width range and a height within the height range; and the cropping area is a rectangular area, and the reference point of the cropping area is a vertex of the rectangular area or a central point of the rectangular area.

In some embodiments, the determining module 403 is configured to determine a plurality of candidate sample pairs from a training sample set, wherein each candidate sample pair includes two training samples acquired based on different original images in the same original image set, determine a similarity of each candidate sample pair, and determine the candidate sample pair with the similarity greater than a similarity threshold as the positive sample pair.

In some embodiments, the determining module 403 is configured to: for each of the candidate sample pairs, extract a feature vector of each training sample in the candidate sample pair based on a convolutional neural network, and acquire the similarity of the candidate sample pair by processing feature vectors of two training samples in the candidate sample pair based on a similarity measurement algorithm.

In some embodiments, the determining module 403 is configured to determine a plurality of negative sample pairs from the training sample set, wherein a number of the negative sample pairs is equal to a number of the plurality of positive sample pairs.

In some embodiments, the training module 404 is configured to mark a ground truth of each positive sample pair as 1, and mark a ground truth of each negative sample pair as 0, and train an image processing model based on the plurality of marked positive sample pairs and the plurality of marked negative sample pairs.

In summary, embodiments of the present disclosure provide an apparatus for training an image processing model. According to the apparatus, by cropping a plurality of original images, the number of training samples is effectively expanded, such that the effect of the image processing model acquired by training is good. Categories of the two training samples in each positive sample pair defined to train the image processing model are the same, and the similarities are high, while the categories of the two training samples in each negative sample pair are different. Therefore, it is ensured that the image processing model acquired by training learns the features of images of different categories well, and then the effect of the image processing model is further improved.

Figure 7:
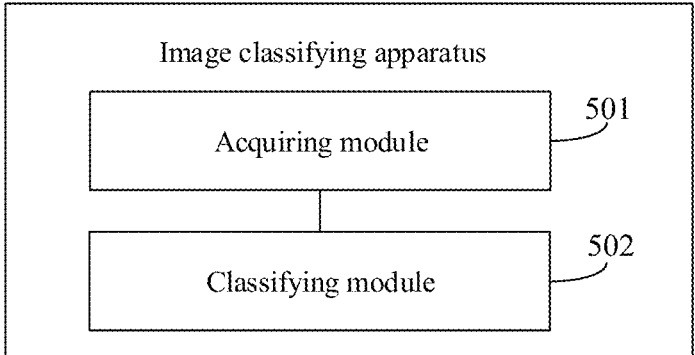
FIG. 7 is a schematic structural diagram of an image classifying apparatus according to some embodiments of the present disclosure.

FIG. 7 is a structural block diagram of an image classifying apparatus according to some embodiments of the present disclosure. As shown in FIG. 7, the apparatus includes:

an acquiring module 501, configured to acquire a to-be-classified target image; and a classifying module 502, configured to input the target image into an image classifying model to acquire a category of the target image outputted by the image classifying model, wherein the image classifying model is acquired by training based on the apparatus for training the image processing model according to the above embodiments.

In some embodiments, the classifying module 502 is configured to input the target image into the image classifying model to acquire a similarity between the target image and reference images of different categories outputted by the image classifying model, and determine a category of a reference image having the highest similarity with respect to the target image in the reference images of different categories as the category of the target image.

In some embodiments, the classifying module 502 is configured to input the target image into the image classifying model to acquire similarities between the target image and image features of different categories outputted by the image classifying model, and determine a category of an image feature having the highest similarity with respect to the target image in the image features of different categories as the category of the target image. The image features of each category are acquired by performing feature extraction on a plurality of training samples of the category.

In summary, embodiments of the present disclosure provide an image classifying apparatus. The image classifying apparatus inputs a to-be-classified target image into an image classifying model, and the image classifying model further outputs a category of the target image. As the image classifying model is acquired by training based on the apparatus for training the image processing model according to the above device embodiments, the performance of the image classifying model is good. That is, the image classifying model extracts image features of the target image well, and accurately determines the category of the target image based on the image features of the target image.

It is understood that, in the apparatus for training the image processing model and the image classifying apparatus according to the above embodiments, the division of the functional modules is merely exemplary. In a practical application, the above functions may be assigned to different functional modules as needed, that is, the internal structure of the device may be divided into different functional modules, so as to implement all or a part of the above functions.

In addition, the apparatus for training the image processing model and the method for training the image processing model according to the above embodiments belong to the same concept, the embodiments of the image classifying apparatus and the image classifying apparatus method belong to the same concept, and specific implementation processes thereof are described in the method embodiments in detail, and are not repeated herein.

Embodiments of the present disclosure further provide an image processing device. The image processing device is a computer device, for example, a server or a terminal. Moreover, the image processing device includes the apparatus for training the image processing model according to the above embodiments, and/or the image classifying apparatus.

Figure 8:
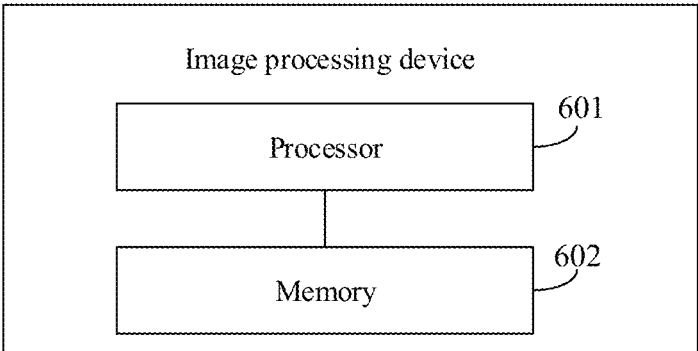
FIG. 8 is a schematic structural diagram of an image processing device according to some embodiments of the present disclosure.

As shown in FIG. 8, the image processing device includes a processor 601 and a memory 602 storing one or more instructions thereon. The processor 601, when loading and executing the one or more instructions, is caused to perform the method for training the image processing model according to the above method embodiments, or the image classifying method according to the above method embodiments.

Embodiments of the present disclosure further provide a non-transitory computer-readable storage medium storing one or more instructions thereon. The one or more instructions, when loaded and executed by a processor, cause the processor to perform the method for training the image processing model according to the above method embodiments, or the image classifying method according to the above method embodiments.

Embodiments of the present disclosure further provide a computer program product or a computer program including one or more computer instructions. The one or more computer instructions, when loaded and executed by a processor, cause the processor to perform the method for training the image processing model as described in the above aspect, or the image classifying method as described in the above aspect.

It is understood that the term "at least one" in the present disclosure refers to one or more, and the meaning of "a plurality of" refers to two or more.

The mentioned "and/or" herein indicates that three relationships may be present. For example, A and/or B may indicate that: only A is present, both A and B are present, and only B is present. The symbol "/" generally indicates an "or" relationship between the associated objects.

It will be appreciated by those of ordinary skill in the art that all or a part of the steps for implementing the above embodiments may be completed by hardware, or may be completed by instructing relevant hardware by a program stored in a computer-readable storage medium. The storage medium mentioned above may be a read-only memory, a magnetic disk, an optical disk, or the like.

Described above are merely exemplary embodiments of the present disclosure and are not intended to limit the present disclosure. Any modifications, equivalents, improvements, and the like, made within the spirit and principle of the present disclosure should fall within the protection scope of the present disclosure.

What is claimed is:

1. A method for training an image processing model, applicable to an image processing device, and the method comprising:

acquiring a plurality of original image sets, wherein each of the original image sets comprises a plurality of original images of a same category, and categories of the original images comprised in different original image sets are different;

acquiring a training sample set by cropping the plurality of original images in the plurality of original image sets, wherein the training sample set comprises a plurality of training samples, and each of the training samples represents a subimage acquired by cropping any of the plurality of original images;

determining a plurality of positive sample pairs and a plurality of negative sample pairs from the training sample set, wherein each of the positive sample pairs comprises two training samples acquired based on different original images in the same original image set, and each of the negative sample pairs comprises two training samples acquired based on the original images in different original image sets; and training the image processing model based on the plurality of positive sample pairs and the plurality of negative sample pairs;

wherein determining the plurality of positive sample pairs from the training sample set comprises:

determining a plurality of candidate sample pairs from the training sample set, wherein each of the candidate sample pairs comprises two training samples acquired based on different original images in the same original image set;

for each of the candidate sample pairs, extracting a feature vector of each training sample in the candidate sample pair based on a convolutional neural network;

acquiring the similarity of the candidate sample pair by processing feature vectors of two training samples in the candidate sample pair based on a similarity measurement algorithm; and determining the candidate sample pair with the similarity greater than a similarity threshold as the positive sample pair.

2. The method for training an image processing model according to claim 1, wherein cropping the plurality of original image samples in the plurality of original image sets comprises:

generating a cropping size within a target size range randomly for each original image to be cropped in the plurality of original image sets;

determining a reference point of a cropping area based on a size of the original image and the cropping size; and determining the cropping area in the original image based on the cropping size and the reference point, and cropping the cropping area.

3. The method for training an image processing model according to claim 2, wherein the target size range comprises a width range and a height range, and the cropping size comprises a width within the width range and a height within the height range; and the cropping area is a rectangular area, and the reference point of the cropping area is a vertex of the rectangular area or a central point of the rectangular area.

4. The method for training an image processing model according to claim 1, wherein determining the plurality of negative sample pairs from the training sample sets comprises:

determining a plurality of negative sample pairs from the training sample set, wherein a number of the negative sample pairs is equal to a number of the plurality of positive sample pairs.

5. The method for training an image processing model according to claim 1, wherein training the image processing model based on the plurality of positive sample pairs and the plurality of negative sample pairs comprises:

marking a ground truth of each of the positive sample pairs as 1 and a ground truth of each of the negative sample pairs as 0; and training the image processing model based on the plurality of marked positive sample pairs and the plurality of marked negative sample pairs.

6. An image classifying method, comprising:

acquiring a to-be-classified target image; and inputting the target image into an image classifying model to acquire a category of the target image outputted by the image classifying model, wherein the image classifying model is acquired by training based on the method for training an image processing model as defined in claim 1.

7. The image classifying method according to claim 6, wherein inputting the target image into the image classifying model to acquire the category of the target image outputted by the image classifying model comprises:

inputting the target image into the image classifying model to acquire a similarity between the target image and reference images of different categories outputted by the image classifying model; and determining a category of a reference image having a highest similarity with respect to the target image in the reference images of different categories as the category of the target image.

8. The image classifying method according to claim 6, wherein inputting the target image into the image classifying model to acquire the category of the target image outputted by the image classifying model comprises:

inputting the target image into the image classifying model to acquire a similarity between the target image and image features of different categories outputted by the image classifying model; and determining a category of an image feature having a highest similarity with respect to the target image in the image features of different categories as the category of the target image, wherein the image features of each category are acquired by performing feature extraction on a plurality of training samples of the category.

9. An image processing device, comprising a processor and a memory storing one or more instructions thereon, wherein the one or more instructions are loaded and executed by the processor to implement:

acquiring a plurality of original image sets, wherein each of the original image sets comprises a plurality of original images of a same category, and categories of the original images comprised in different original image sets are different;

acquiring a training sample set by cropping the plurality of original images in the plurality of original image sets, wherein the training sample set comprises a plurality of training samples, and each of the training samples represents subimage acquired by cropping any of the plurality of original images;

determining a plurality of positive sample pairs and a plurality of negative sample pairs from the training sample set, wherein each of the positive sample pairs comprises two training samples acquired based on different original images in the same original image set, and each of the negative sample pairs comprises two training samples acquired based on the original images in different original image sets; and training the image processing model based on the plurality of positive sample pairs and the plurality of negative sample pairs;

wherein the one or more instructions are loaded and executed by the processor to implement:

determining a plurality of candidate sample pairs from the training sample set wherein each of the candidate sample pairs comprises two training samples acquired based on different original images in the same original image set;

for each of the candidate sample pairs, extracting a feature vector of each training sample in the candidate sample pair based on a convolutional neural network;

acquiring the similarity of the candidate sample pair by processing feature vectors of two training samples in the candidate sample pair based on a similarity measurement algorithm; and determining the candidate sample pair with the similarity greater than a similarity threshold as the positive sample pair.

10. A non-transitory computer-readable storage medium storing one or more instructions thereon, wherein the one or more instructions are loaded and executed by a processor to implement:

acquiring a plurality of original image sets, wherein each of the original image sets comprises a plurality of original images of a same category, and categories of the original images comprised in different original image sets are different;

acquiring a training sample set by cropping the plurality of original images in the plurality of original image sets, wherein the training sample set comprises a plurality of training samples, and each of the training samples represents a subimage acquired by cropping any of the plurality of original images;

determining a plurality of positive sample pairs and a plurality of negative sample pairs from the training sample set, wherein each of the positive sample pairs comprises two training samples acquired based on different original images in the same original image set, and each of the negative sample pairs comprises two training samples acquired based on the original images in different original image sets; and training the image processing model based on the plurality of positive sample pairs and the plurality of negative sample pairs;

wherein the one or more instructions are loaded and executed by a processor to implement:

determining a plurality of candidate sample pairs from the training sample set, wherein each of the candidate sample pairs comprises two training samples acquired based on different original images in the same original image set;

for each of the candidate sample pairs, extracting a feature vector of each training sample in the candidate sample pair based on a convolutional neural network;

acquiring the similarity of the candidate sample pair by processing feature vectors of two training samples in the candidate sample pair based on a similarity measurement algorithm; and determining the candidate sample pair with the similarity greater than a similarity threshold as the positive sample pair.

11. The image processing device according to claim 9, wherein the one or more instructions are loaded and executed by the processor to implement:

generating a cropping size within a target size range randomly for each original image to be cropped in the plurality of original image sets;

determining a reference point of a cropping area based on a size of the original image and the cropping size; and determining the cropping area in the original image based on the cropping size and the reference point, and cropping the cropping area.

12. The image processing device according to claim 11, wherein the target size range comprises a width range and a height range, and the cropping size comprises a width within the width range and a height within the height range; and the cropping area is a rectangular area, and the reference point of the cropping area is a vertex of the rectangular area or a central point of the rectangular area.

13. The image processing device according to claim 9, wherein the one or more instructions are loaded and executed by the processor to implement:

determining a plurality of negative sample pairs from the training sample set, wherein a number of the negative sample pairs is equal to a number of the plurality of positive sample pairs.

14. The image processing device according to claim 9, wherein the one or more instructions are loaded and executed by the processor to implement:

marking a ground truth of each of the positive sample pairs as 1 and a ground truth of each of the negative sample pairs as 0; and training the image processing model based on the plurality of marked positive sample pairs and the plurality of marked negative sample pairs.

15. An image processing device, comprising a processor and a memory storing one or more instructions thereon, wherein the one or more instructions are loaded and executed by the processor to implement the image classifying method as defined in claim 6.

16. A non-transitory computer-readable storage medium storing one or more instructions thereon, wherein the one or more instructions are loaded and executed by a processor to implement the image classifying method as defined in claim 6.

* * * * *